(12) United States Patent  
Tsurumaru et al.

(10) Patent No.: US 10,153,647 B2  
(45) Date of Patent: Dec. 11, 2018

(54) STORAGE BATTERY SYSTEM

(71) Applicant: TOSHIBA MITSUBISHI-ELECTRIC INDUSTRIAL SYSTEMS CORPORATION, Chuo-ku (JP)

(72) Inventors: Daisuke Tsurumaru, Tokyo (JP); Masato Hanada, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 46 days.

(21) Appl. No.: 14/914,054

(22) PCT Filed: Sep. 19, 2013

(86) PCT No.: PCT/JP2013/075346  
§ 371 (c)(1),  
(2) Date: Feb. 24, 2016

(87) PCT Pub. No.: WO2015/040725  
PCT Pub. Date: Mar. 26, 2015

(65) Prior Publication Data  
US 2016/0211684 A1     Jul. 21, 2016

(51) Int. Cl.  
*H02J 7/00* (2006.01)  
*H02H 7/18* (2006.01)  
(Continued)

(52) U.S. Cl.  
CPC ........... *H02J 7/0029* (2013.01); *H01M 10/44* (2013.01); *H02H 7/18* (2013.01); *H02J 3/32* (2013.01);  
(Continued)

(58) Field of Classification Search  
USPC ....................................................... 320/134  
See application file for complete search history.

(56) References Cited

U.S. PATENT DOCUMENTS

2007/0120530 A1* 5/2007 Nozaki .................. B60L 3/0046  
                                                                320/130  
2011/0298626 A1    12/2011 Fechalos  
(Continued)

FOREIGN PATENT DOCUMENTS

CN         103081281 A    5/2013  
JP       2005-151770 A    6/2005  
(Continued)

OTHER PUBLICATIONS

Japanese Office Action dated May 9, 2017 in Japanese Patent Application No. 2015-537511 (with unedited computer generated English translation).  
(Continued)

*Primary Examiner* — Mohammed Alam  
(74) *Attorney, Agent, or Firm* — Oblon, McClelland, Maier & Neustadt, L.L.P.

(57) ABSTRACT

A storage battery system connected to a power system includes: a storage battery; a BMU which monitors a state of the storage battery with a first sensor; a PCS which charges the storage battery and discharges from the storage battery with reference to an output value of a second sensor similar in type to the first sensor; and a control device. The control device receives a charge/discharge request and storage battery information supplied from the BMU and controls the PCS based on the charge/discharge request and the storage battery information. An abnormality detection unit of the control device acquires the output value of the second sensor from the PCS, and detects abnormality of any sensor as a result of comparison between the output value of the second sensor and an output value of the first sensor included in the storage battery information.

6 Claims, 3 Drawing Sheets

(51) Int. Cl.
*H02J 3/32* (2006.01)
*H02J 7/34* (2006.01)
*H01M 10/44* (2006.01)

(52) U.S. Cl.
CPC ............ *H02J 7/007* (2013.01); *H02J 7/34* (2013.01); *H02J 7/0047* (2013.01)

(56) References Cited

U.S. PATENT DOCUMENTS

| | | |
|---|---|---|
| 2012/0319657 A1 | 12/2012 | Ke |
| 2014/0001863 A1 | 1/2014 | Zhang |
| 2014/0015469 A1 | 1/2014 | Beaston |
| 2014/0152267 A1* | 6/2014 | Hashimoto ............ H01M 10/48 320/134 |
| 2016/0204629 A1* | 7/2016 | Tsurumaru ................ H02J 3/32 320/118 |
| 2016/0204647 A1* | 7/2016 | Tsurumaru ................ H02J 3/32 320/107 |
| 2016/0211678 A1* | 7/2016 | Tsurumaru ................ H02J 3/32 |
| 2016/0211681 A1* | 7/2016 | Tsurumaru ................ H02J 3/32 |
| 2016/0211684 A1* | 7/2016 | Tsurumaru ............... H02H 7/18 |
| 2017/0256945 A1* | 9/2017 | Hanada ................... H02J 7/042 |

FOREIGN PATENT DOCUMENTS

| | | |
|---|---|---|
| JP | 2011-009148 | 1/2011 |
| JP | 2012-075243 A | 4/2012 |
| JP | 2012-175864 A | 9/2012 |
| JP | 2013-027210 A | 2/2013 |
| JP | 2013-103660 A | 5/2013 |
| JP | 2013-153548 A | 8/2013 |
| JP | 2013-169069 | 8/2013 |
| WO | WO 2013/038483 A1 | 3/2013 |

OTHER PUBLICATIONS

English translation of the International Preliminary Report on Patentability and Written Opinion dated Mar. 31, 2016 in PCT/JP2013/075346 filed Sep. 19, 2013.

International Search Report dated Dec. 24, 2013, in PCT/JP2013/075346 filed Sep. 19, 2013.

Office Action dated Jan. 9, 2018 in Japanese Patent Application No. 2015-537511 (with unedited computer generated English translation) citing documents AO and AP therein, 9 pages.

Office Action dated Jul. 25, 2017, in corresponding Chinese Patent Application No. 201380079674.9 (with English-language translation).

Office Action dated Mar. 21, 2018, in corresponding Chinese Patent Application No. 201380079674.9.

Office Action dated Aug. 17, 2017, in related U.S. Appl. No. 14/915,938.

Notice of Allowance dated Dec. 14, 2017, in related U.S. Appl. No. 14/915,938.

Office Action dated Apr. 4, 2017, in corresponding Japanese Patent Application No. 2015-537507 (with partial English-language translation).

Office Action dated Jul. 31, 2017, in corresponding Chinese Patent Application No. 201380079684.2 (with English-language translation).

Indian Office Action dated Oct. 4, 2018 in Indian Patent Application No. 201617005264.

* cited by examiner

STORAGE BATTERY SYSTEM

TECHNICAL FIELD

The present invention relates to a storage battery system connected to a power system.

BACKGROUND ART

A power system is constructed by connecting a power generation facility and a load facility through a power transmission and distribution facility. There are power systems of various scales, ranging from large-scale systems that connect a plurality of large-scale power plants with a large number of plants, commercial establishments and households to small-scale systems constructed in specific facilities. The power systems of all the scales include an energy management system (EMS) that manages electric power supply/demand in the entire power system. The EMS balances electric power supply from the power generation facilities and electric power demand from the load facilities.

A storage battery system is connected to the power system as described above to be used as one means for balancing electric power supply and demand. Although a large amount of electric power was once thought hard to store, mass storage batteries like lithium ion batteries and sodium sulfur batteries, which are now in practical use, make it possible to store a large amount of electric power. By connecting the storage battery system including such storage batteries to the electric power system, it becomes possible to adopt such an operation as to charge the storage batteries with electric power excessively generated when electric power supply exceeds electric power demand and to discharge electric power from the storage batteries to compensate shortage of electric power caused when electric power demand exceeds electric power supply.

One adequate application example of such a storage battery system is a combination of the storage battery system with a power generation facility using energy of nature, such as sunlight and wind force. The power generation facilities using the energy of nature are widely being introduced in response to increased interest in energy issues or environmental issues of these days. However, the power generation facilities using the energy of nature have a disadvantage that natural factors, such as seasons and weather, tend to affect electric power to be generated and hinder stable supply of electric power. The storage battery system can make up for the disadvantage, so that stable electric power supply can be achieved by combining the storage battery system with the power generation facilities using the energy of nature.

When the storage battery system is connected to the power system, the operation of the storage battery system is managed by the above-mentioned EMS. The storage battery system includes a power conditioning system (PCS) connected to the storage battery. The PCS has a function of converting AC power of the power system into DC power and charging the storage battery with the DC power, and a function of converting DC power of the storage battery into AC power and discharging the AC power to the power system. When a charge/discharge request is supplied from the EMS to the PCS, the PCS operates in response to the charge/discharge request. As a result, charge of the storage battery with electric power from the power system or discharge of electric power from the storage battery to the power system is achieved.

The applicant of the present invention recognizes the following literature as related art of the present invention.

FIG. 9 in Patent Literature 1 illustrates one example of a storage battery system connected to the power system.

CITATION LIST

Patent Literature

Patent Literature 1: Japanese Patent Laid-Open No. 2013-27210
Patent Literature 2: Japanese Patent Laid-Open No. 2012-75243

SUMMARY OF INVENTION

Technical Problem

The PCS performs charge/discharge operation with reference to a current value and a voltage value measured by sensors included in the PCS. Accordingly, when measurement accuracy of the current value or the voltage value measured by the sensors is abnormal, control accuracy of the charge/discharge electric power amount is affected thereby. It is therefore demanded to promptly and correctly detect abnormality of the sensors included in the PCS.

The storage battery has a battery management unit (BMU) attached thereto, the battery management unit being configured to monitor the state of the storage battery. The monitoring items of the BMU includes a current value and a voltage value, which are measured by sensors included in the BMU. The BMU detects abnormality of the storage battery from such parameters as the current value and the voltage value. However, when the sensor itself is abnormal, it is not possible to correctly detect abnormality of the storage battery. It is therefore demanded to promptly and correctly detect abnormality of the sensors included in the BMU as in the case of the sensors included in the PCS.

However, it is difficult for the conventionally proposed storage battery system to satisfy the above-stated demand with respect to detection of the abnormality of the sensors. In order to detect the abnormality of the sensors, an entity that objectively determines the presence or absence of abnormality is needed. Although the EMS is one of the candidates of such an entity, there is no denying that the EMS has difficulty in playing the role of that entity in actuality. Since the EMS executes a huge amount of arithmetic calculation, it is extremely difficult for the EMS to continuously monitor the output values of the sensors in the PCS and/or the BMU.

The present invention has been made in view of the above-mentioned problem, and it is therefore an object of the present invention to provide a storage battery system capable of promptly and correctly detecting abnormality of sensors relating to charge/discharge performance.

Solution to Problem

In order to accomplish the above object, a storage battery system according to the present invention is configured as described below.

The storage battery system according to the present invention is connected to a power system and is configured to operate based on a charge/discharge request from an energy management system that manages electric power supply/demand of the power system. There is no limitation on the scale and configuration of the power system to be connected to the storage battery system according to the present invention.

The storage battery system according to the present invention includes a storage battery, a battery management unit, a power conditioning system, and a control device. The storage battery may be constituted of a single storage battery cell, or may be constituted as an assembly of a plurality of storage battery cells. As for the type of storage battery, a mass storage battery such as a lithium ion battery, a sodium sulfur battery, and a nickel-hydrogen battery is preferable.

The battery management unit is configured to monitor the state of the storage battery. The battery management unit monitors the state quantity of monitoring items such as current, voltage, and temperature. The battery management unit measures the state quantity of the monitoring items with sensors on a constant basis or at a specified cycle, and outputs some or all of the obtained data to the outside as storage battery information.

The power conditioning system is configured to connect the storage battery to the power system. The power conditioning system has a function of converting AC power of the power system into DC power and charging the storage battery with the DC power and a function of converting DC power of the storage battery into AC power and discharging the AC power to the power system. The power conditioning system is also called a power conditioner, which regulates the amount of electric power for charging the storage battery and the amount of electric power discharged from the storage battery. The power conditioning system refers to output values of sensors in adjustment of the charge electric power amount and the discharge electric power amount. The sensors include, for example, a current sensor and a voltage sensor for measuring physical values relating to the charge electric power amount and the discharge electric power amount.

The control device is a device interposed between the energy management system and the power conditioning system. The control device receives the charge/discharge request supplied from the energy management system to the storage battery system. The control device is configured to receive, together with the charge/discharge request, the storage battery information supplied from the battery management unit and to control the power conditioning system based on the charge/discharge request and the storage battery information.

The control device includes an abnormality detection unit. The abnormality detection unit compares an output value of the sensor acquired from the power conditioning system and an output value of the sensor acquired from the battery management unit. The sensor (first sensor) of the battery management unit and the sensor (second sensor) of the power conditioning system, which output values to be compared by the abnormality detection unit, are similar in type. For example, when the first sensor is a current sensor, the second sensor that outputs a value to be compared is also a current sensor. When the first sensor is a voltage sensor, the second sensor that outputs a value to be compared is also a voltage sensor. The abnormality detection unit detects abnormality of the first sensor or the second sensor as a result of comparison between the output value of the first sensor and the output value of the second sensor. Examples of the comparison method to be adopted include a method in which abnormality is determined if a difference between the output values is larger than a threshold, a method in which abnormality is determined if a ratio between the output values is larger than a threshold, or a method combining the methods disclosed.

In a preferable aspect of the storage battery system according to the present invention, the control device further includes a malfunction indication lamp configured to be turned on when the abnormality detection unit detects abnormality. The turned-on malfunction indication lamp can swiftly notify an operator of occurrence of abnormality.

In another preferable aspect of the storage battery system according to the present invention, the control device further includes an interlock processing unit. The interlock processing unit is configured to perform interlock processing upon detection of abnormality of the abnormality detection unit.

Advantageous Effects of Invention

According to the storage battery system in the present invention, detection of abnormality is performed not by the energy management system present in the distance but by the control device that directly controls the power conditioning system in response to the charge/discharge request from the energy management system. Since the control device is provided for control of the power conditioning system, an arithmetic load of the control device is smaller than that of the energy management system. Therefore, the control device has a capacity to continuously monitor the output values of the sensors of both the battery management unit and the power conditioning system. According to the method for comparing the respective output values of the first sensor and the second sensor which are similar in type, it becomes possible to easily detect occurrence of abnormality in at least one sensor when the output values are deviated from each other. Therefore, the storage battery system according to the present invention can promptly and correctly detect abnormality of the sensor relating to charge/discharge performance, such as a current sensor and a voltage sensor.

DESCRIPTION OF EMBODIMENT

Hereinafter, an embodiment of the present invention will be described in detail with reference to the drawings. It is to be noted that like component members are designated by like reference signs to omit redundant description.

First Embodiment

Overall Configuration of First Embodiment

Figure 1:
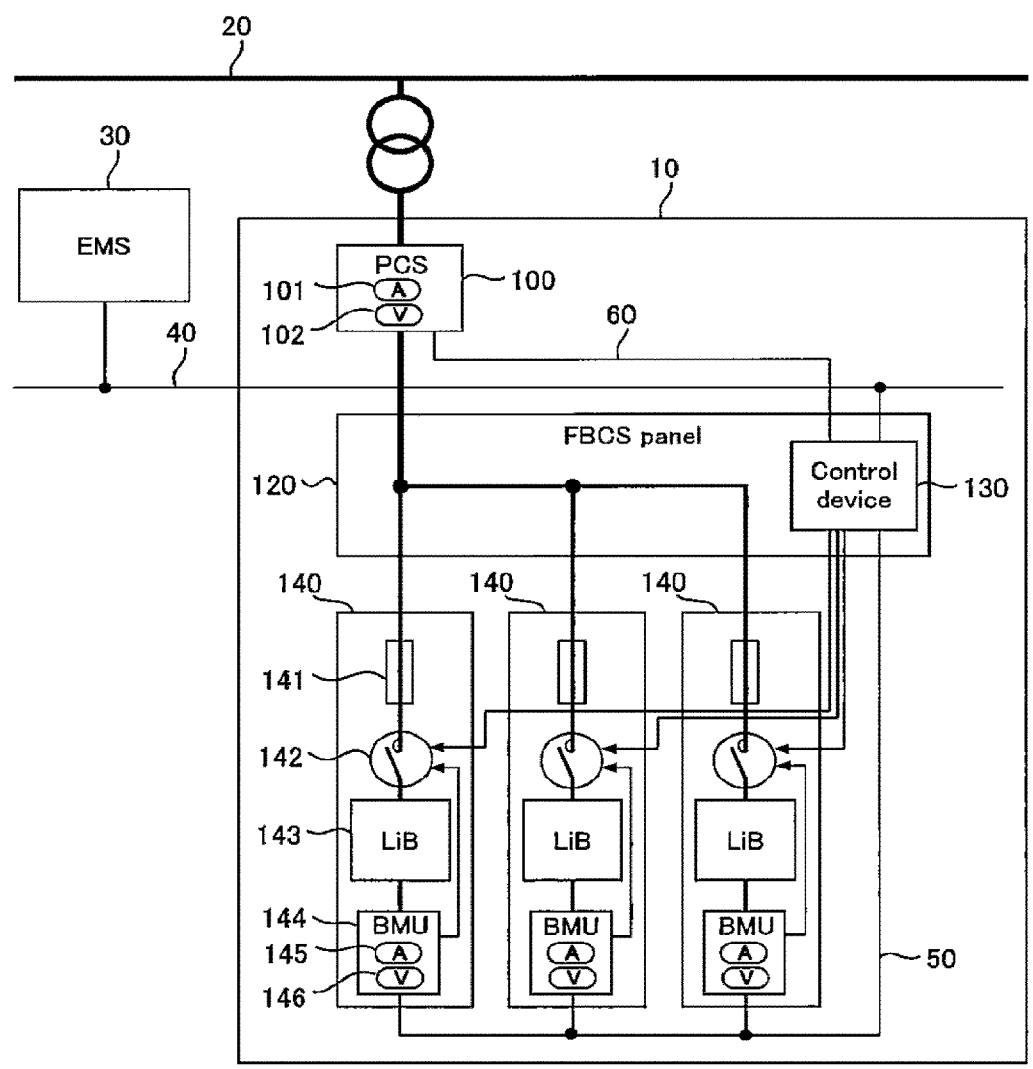
FIG. 1 is a conceptual block diagram for describing the configuration of a system according to a first embodiment of the present invention.

FIG. 1 is a conceptual block diagram for describing the system configuration according to a first embodiment of the present invention. A storage battery system 10 illustrated in FIG. 1 is connected to a power transmission facility 20 of a power system. The power system includes, in addition to the power transmission facility 20, a power generation facility (illustration omitted) connected to the power transmission facility 20, and a load facility (illustration omitted) connected to the power transmission facility 20. The storage battery system 10 is connected to an energy management system (hereinafter referred to as EMS) 30 present in the distant through a computer network 40. The EMS 30 manages electric power supply/demand of the power system, such as the power generation amount of the power generation facility, the charge/discharge amount of the storage battery system 10, and the power reception amount of the load facility.

The storage battery system 10 includes a power conditioning system (hereinafter referred to as PCS) 100, a front battery control station panel (hereinafter referred to as FBCS panel) 120, and storage battery panels 140. In the storage battery system 10, one PCS 100 is connected to one FBCS panel 120, and the one FBCS panel 120 is connected a plurality of storage battery panels 140 in parallel. Although three rows of storage battery panels 140 are provided in FIG. 1, this configuration is merely an example. The number of the storage battery panels 140 arranged in parallel is determined based on the specification of the PCS 100. Therefore, the number of the row of the storage battery panel 140 may be only one.

(Storage Battery Panel)

The storage battery panel 140 includes a fuse 141, a contactor 142, a storage battery module 143, and a battery management unit (hereinafter referred to as BMU 144). The storage battery module 143 is a module constituted of a plurality of cells connected in series. Each cell is a lithium ion battery (LiB). The storage battery module 143 is connected to the FBCS panel 120 via the contactor 142 and the fuse 141 and through a power transmission line. The storage battery module 143 is also connected to the BMU 144 through a signal line. The BMU 144 is connected to the control device 130 on the FBCS panel 120 through a computer network 50, and to the contactor 142 through the signal line.

The BMU 144 monitors the state of the storage battery module 143. Specifically, the BMU 144 includes a current sensor 145 and a voltage sensor 146 as means for measuring the state quantities of the storage battery module 143. The current sensor 145 measures current passing through the storage battery module 143. The voltage sensor 146 measures the voltage applied to the storage battery module 143. These sensors 145 and 146 do not necessarily have to be provided inside the casing of the BMU 144. The sensors 145 and 146 attached to the storage battery module 143 and the BMU 144 may be connected through the signal line. The BMU 144 also measures the temperature of the storage battery module 143 with a temperature sensor not illustrated. The storage battery module 143 is constantly monitored by the BMU 144. However, the constant monitoring described in the present embodiment is a concept including not only the operation of taking in continuous signals without an intermission from the sensors but also the operation of taking in the signals of the sensors at a specified short cycle. The BMU 144 transmits to the control device 130 storage battery information including the information obtained by measurement performed by each sensor.

The contactor 142 is disposed between the fuse 141 and the storage battery module 143. Upon reception of an ON signal, a point of contact of the contactor 142 is set to ON and so the contactor 142 is turned on. Upon reception of an OFF signal, the point of contact is set to OFF and so the contactor 142 is turned off. For example, the ON signal is a current of more than a specified value [A], and the OFF signal is a current of less than the specified value [A]. When the contactor 142 is turned on, the PCS 100 and the storage battery module 143 are electrically connected, and when the contactor 142 is turned off, the PCS 100 and the storage battery module 143 are electrically disconnected.

(FBCS Panel)

The FBCS panel 120 is connected to the storage battery panels 140 and the PCS 100. Specifically, the storage battery panels 140 are each connected to the FBCS panel 120 through individual power transmission lines. The individual power transmission lines converge inside the FBCS panel and are connected to a thicker power transmission line. The converged power transmission line is connected to the PCS 100. The FBCS panel 120 also includes the control device 130. The control device 130 includes memories including a ROM and a RAM for example, an input/output interface for inputting and outputting a variety of information, and a processor that can execute various arithmetic processes based on the variety of information. The control device 130 is connected to the EMS 30 through the computer network 40, to the BMU 144 through the computer network 50, and to the PCS 100 through a computer network 60. The control device 130 is connected to the contactor 142 through the signal line.

The control device 130 plays the role of a commander that issues a charge/discharge command to the PCS 100. In one example, the control device 130 receives a charge/discharge request transmitted from the EMS 30 and storage battery information transmitted from the BMU 144. The charge/discharge request includes a request with respect to active power and reactive power charged and discharged by the PCS 100. The charge/discharge request includes a specific request numerically indicating a specific electric power amount, and an abstract request requesting maximum charge/discharge power. The control device 130 determines a charge/discharge command (equivalent to a charge/discharge amount [kW]) to be issued to the PCS 100 based on the charge/discharge request and the storage battery information, and transmits the command to the PCS 100. The control device 130 also includes functions such as a function of safely controlling the performance and life of the storage battery module 143 to the maximum, a function of outputting a trip signal to the PCS 100, and a function of turning on and off the contactor 142.

(PCS)

The PCS 100 is connected to the power transmission facility 20 via a transformer and through the power transmission line. The PCS 100 has a charging function which converts AC power of the power system into DC power and charges the storage battery module 143 with the DC power, and a discharging function which converts DC power of the storage battery module 143 into AC power and discharges the AC power to the power system. The amount of electric power to charge the storage battery module 143 and the amount of electric power discharged from the storage battery module 143 are adjusted by the PCS 100. Regulation of the charge/discharge electric power amount by the PCS 100 is performed in accordance with the charge/discharge instruction supplied from the control device 130.

The PCS 100 includes a current sensor 101 and a voltage sensor 102. The current sensor 101 measures the current that charges the storage battery module 143 or that is discharged from the storage battery module 143. The voltage sensor 102 measures voltage of the storage battery module 143 subjected to charge or discharge. The PCS 100 regulates charge/discharge electric power amount with reference to output values of these sensors. The PCS 100 transmits to the control device 130 the output values of these sensors as PCS information.

Characteristic Configuration of First Embodiment

Figure 2:
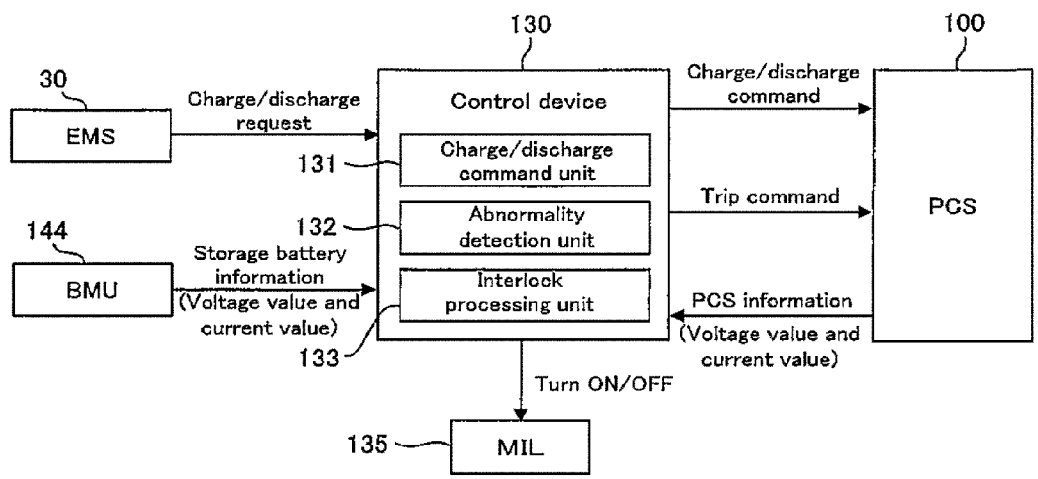
FIG. 2 is a block diagram of the system according to the first embodiment of the present invention.

FIG. 2 is a block diagram of the system according to the first embodiment of the present invention. In FIG. 2, a block representing the control device 130 contains blocks representing some of various functions included in the control device 130. An arithmetic resource is assigned to each of these blocks. Programs corresponding to the respective blocks are prepared for the control device 130, and these programs are executed by the processor, so that the functions of the respective blocks are implemented in the control device 130.

(Charge/Discharge Command Function)

The control device 130 has a charge/discharge command function, which is implemented by a charge/discharge command unit 131. The control device 130 receives a charge/discharge request from the EMS 30, and receives storage battery information from the BMU 144. The charge/discharge command unit 131 determines a charge/discharge command based on the charge/discharge request and the storage battery information, and transmits the charge/discharge command to the PCS 100. Specifically, the charge/discharge command unit 131 calculates chargeable/dischargeable electric power based on the voltage of the storage battery module 143 included in the storage battery information. The voltage as used in the present embodiment refers to a voltage across the storage battery module 143. The charge/discharge command unit 131 determines a charge/discharge command to the PCS 100 based on the charge/discharge request from the EMS 30 by using the chargeable/dischargeable electric power as a constraint condition.

(Abnormality Detection Function)

The control device 130 has an abnormality detection function, which is implemented by an abnormality detection unit 132. The abnormality detection unit 132 detects abnormality of the sensors of the storage battery system 10 based on the storage battery information received from the BMU 144 and the PCS information received from the PCS 100. The storage battery information includes the voltage value measured by the voltage sensor 146 of the BMU 144, and the PCS information includes the voltage value measured by the voltage sensor 102 of the PCS 100. Since these two voltage sensors 102 and 146 measure the same voltage, the two voltage values should be coincident or a difference between these two voltage values should be within a margin of error. If the difference between these two voltage values exceeds the margin of error, it can be considered that abnormality occurs at least in one of the two voltage sensors 102 and 146. The abnormality detection unit 132 compares the two voltage values and determines whether or not a difference of a specified value or more is generated. If it is confirmed that the difference of the specified value or more is generated in between the two voltage values, the abnormality detection unit 132 detects the difference as abnormality of the voltage sensor.

The storage battery information also includes the current value measured by the current sensor 145 of the BMU 144, and the PCS information includes the current value measured by the current sensor 101 of the PCS 100. When one storage battery module 143 is electrically connected with the PCS 100, the two current values should be coincident or a difference between the two current values should be within a margin of error. If the difference between these two current values exceeds the margin of error, it can be considered that abnormality occurs at least in one of the two current sensor 101 and 145. The abnormality detection unit 132 compares the two current values and determines whether or not a difference of a specified value or more is generated. If it is confirmed that the difference of the specified value or more is generated in between the two current values, the abnormality detection unit 132 detects the difference as abnormality of the current sensor.

When a plurality of storage battery modules 143 are electrically connected with the PCS 100, the abnormality detection unit 132 calculates a sum of the current values of the current sensors 145 of all the storage battery modules 143 which are in connection. The storage battery modules 143 are connected in parallel, and therefore when there is no abnormally in both the current sensors 101 and 145, the sum of the current values measured by each of the storage battery modules 143 should be coincident with the current value measured by the PCS 100. Accordingly, the abnormality detection unit 132 compares the sum of the current values measured by the storage battery modules 143 with the current value of the current sensor 101, and determines whether or not a difference of a specified value or more is generated. If it is confirmed that the difference of the specified value or more is generated in between the two current values, the abnormality detection unit 132 detects the difference as abnormality of the current sensor.

The abnormality detection unit 132 turns on the malfunction indication lamp (MIL) 135 upon detection of either abnormality of the voltage sensor or abnormality of the current sensor. The MIL 135, which is disposed on the FBCS panel 120, is connected with the control device 130 through the signal line. Specifically, the MIL 135 is displayed in the screen of an operation panel operated by an operator. The MIL 135 is turned off when no abnormality occurs and is turned on by the abnormality detection unit 132 when abnormality occurs in any sensor.

(Interlock Function)

The control device 130 also has an interlock function, which is implemented by the interlock processing unit 133. When abnormality occurs in the current sensor or the voltage sensor, normal charge/discharge operation cannot be performed on the storage battery module 143, which may result in overdischarge and/or overcharge of the storage battery module 143. Accordingly, when abnormality of any sensor is detected by the abnormality detection unit 132, the interlock processing unit 133 controls the PCS 100 by a software interlock mechanism. Specifically, the interlock processing unit 133 first stops output of a charge/discharge command to the PCS 100, and further outputs a trip command to the PCS 100. Once the output of the charge/discharge command is stopped, indication values of the charge electric power amount and the discharge electric power amount become zero, and the PCS 100 stops charge/discharge operation. Upon reception of the trip command, the PCS 100 shuts off its own circuit. Thus, double interlock processing including stopping output of the charge/discharge command to the PCS 100 and outputting the trip command is performed. As a result, occurrence of more serious abnormality, such as overdischarge and/or overcharge caused by abnormality of any sensor, can more reliably be prevented.

It is to be noted that the storage battery system 10 is also provided with a hardware interlock mechanism executed by the BMU 144 as an interlock function to cope with abnormality. When overdischarge and/or overcharge occur in spite of the software interlock mechanism being operated, the hardware interlock mechanism by the BMU 144 is operated. As a result, the contactor 142 is forcibly turned off.

(Flow Chart)

Figure 3:
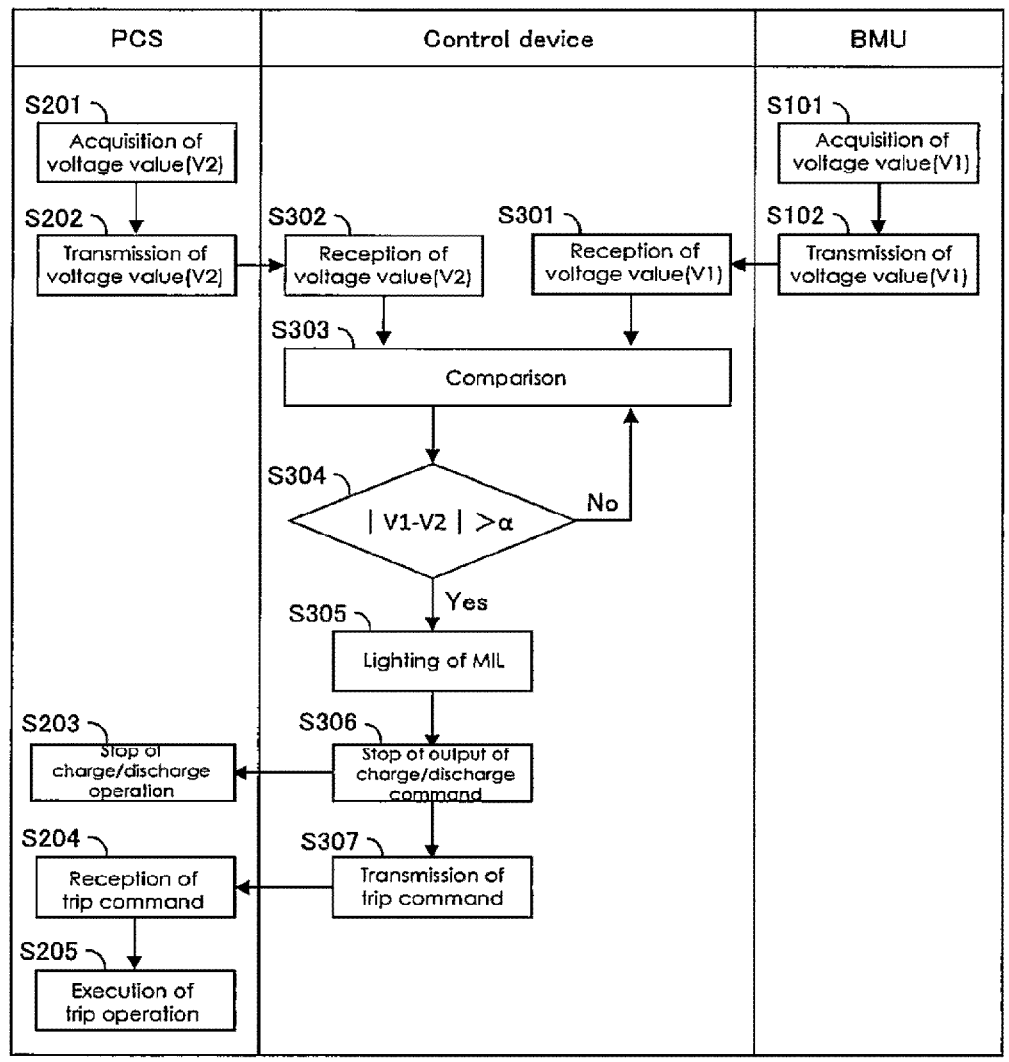
FIG. 3 is a flow chart of a control routine executed by the storage battery system in the first embodiment of the present invention.

FIG. 3 is a flow chart of a control routine executed by the storage battery system 10 to prevent overcharge and/or overdischarge attributed to abnormality of the sensors. Processing of the control device 130 illustrated in this flow chart is implemented by the functions of the abnormality detection unit 132 and the interlock processing unit 133. The memory of the control device 130 stores programs for executing the processing of the flow chart illustrated in FIG. 3. When the processor of the control device 130 reads and executes the programs, the processing illustrated in FIG. 3 is implemented.

In the routine illustrated in FIG. 3, the BMU 144 acquires a voltage value (V1) of the storage battery module 143 on the constant basis by using the voltage sensor 146 (step S101). Then, the BMU 144 transmits to the control device 130 the acquired voltage value (V1) together with other storage battery information (step S102).

Meanwhile, the PSC 100 acquires a voltage value (V2) of the storage battery module 143 on the constant basis by using the voltage sensor 102 (step S201). Then, the PCS 100 transmits to the control device 130 the acquired voltage value (V2) together with other PCS information (step S202).

The control device 130 receives the voltage value (V1) transmitted from the BMU 144 (step S301). The control device 130 also receives the voltage value (V2) transmitted from the PCS 100 (step S302). The control device 130 compares the voltage value (V1) received in step S301 with the voltage value (V2) received in step S302, and calculates a difference therebetween (step S303). The control device 130 then determines whether or not the difference between the two voltage values is larger than a specified threshold α (step S304). When the difference is larger than the threshold α, it is estimated that abnormality occurs at least in one of the voltage sensors.

The determination processing of step S304 is repeatedly executed until the difference between the two voltage values is larger than the threshold α. The comparing processing of step S304 is executed whenever the voltage value (V1) is acquired in step S101 and is transmitted from the BMU 144 to the control device 130, and whenever the voltage value (V2) is acquired in step S201 and is transmitted from the PCS 100 to the control device 130.

Although the description with reference to the flow chart is omitted, processing similar to a series of processing described above is also performed on the current value. The current value transmitted from the BMU 144 (a sum of the current values transmitted from each of the BMUs 144 in the case of the plurality of storage battery modules 143) is compared with the current value transmitted from the PCS 100, and it is determined whether or not a difference between the two current values is larger than a specified threshold. When the difference is larger than the threshold, it is estimated that abnormality occurs at least in one of the current sensors.

The control device 130 turns on the MIL 135 when abnormality of any voltage sensor is detected as a result of determination in step S304 (step S305). Similarly, when abnormality of any current sensor is detected, the control device 130 turns on the MIL 135. Next, the control device 130 stops output of a charge/discharge command to the PCS 100 (step S306). The control device 130 further transmits a trip command to the PCS 100 (step S307).

The PCS 100 stops charge/discharge operation for the storage battery module 143 in response to the stop of the charge/discharge command (step S203). The PCS 100 then receives the trip command transmitted from the control device 130 (step S204). The PCS 100 shuts off the circuit in response to the trip command (step S205). As a result, the PCS 100 completes the software interlock operation for the abnormality of the sensor detected by the control device 130.

As described in the foregoing, the storage battery system 10 of the present embodiment adopts the method in which output values of the current sensors and the voltage sensors, similar in type and provided on each of the BMU 144 side and the PCS 100 side, are compared, and abnormality of any sensor is detected as a result of comparison. However, this method fails to identify which sensor is abnormal, the BMU 144-side sensor or the PCS 100-side sensor. However, since the abnormality of these sensors affects the charge/discharge performance of the storage battery and further causes more serious abnormality such as overcharge and overdischarge, what is important is not specifically identifying the sensor having abnormality but promptly and correctly detecting occurrence of the abnormality. In view of this point, the storage battery system 10 of the present embodiment can promptly and correctly detect occurrence of abnormality in any one of the current sensors or the voltage sensors by the simple method as described before.

Others

The present invention is not limited to the embodiment disclosed, but various modifications are possible without departing from the scope of the present invention. For example, as a specific method for comparing output values of two sensors, the method for comparing a difference between the output values with a threshold is adopted in the embodiment disclosed. However, a method for comparing a ratio between the output values with a threshold may also be adopted. It is also possible to adopt a method in which an error ratio of the output value of one sensor relative to the output value of the other sensor is compared with a threshold.

Although the control device 130 is placed on the FBCS panel 120 in the system of the embodiments described in the foregoing, the placement position of the control device 130 is not limited thereto. For example, the control device 130 may be placed in the PCS 100, the storage battery panel 140, or in any one of the BMUs 144. Moreover, various functions mounted on the control device 130 may be mounted on the PCS 100, and be installed in the PCS 100. These various functions may also be installed in the storage battery panel 140 and on the BMUs 144.

REFERENCE SIGNS LIST

10 Storage battery system
20 Power transmission facility
30 Energy management system (EMS)
40, 50, 60 Computer network
100 Power conditioning system (PCS)
101 Current sensor
102 Voltage sensor
120 FBCS panel
130 Control device
131 Charge/discharge command unit
132 Abnormality detection unit
133 Interlock processing unit
140 Storage battery panel
141 Fuse
142 Contactor
143 Storage battery module
144 Battery management unit (BMU)
145 Current sensor
146 Voltage sensor

The invention claimed is:
1. A storage battery system connected to a power system and operative based on a charge/discharge request from an energy management system that manages electric power supply/demand of the power system, the storage battery system comprising:
a storage battery;
battery management circuitry configured to monitor a state of the storage battery with a first sensor;
power conditioning circuitry configured to
convert AC power of the power system into DC power;
charge the storage battery with the DC power;
convert DC power of the storage battery into AC power;
discharge the AC power to the power system; and
perform charge to the storage battery and discharge from the storage battery with reference to an output value of a second sensor; and
control circuitry configured to
receive the charge/discharge request and storage battery information supplied from the battery management circuitry;
control the power conditioning circuitry based on the charge/discharge request and the storage battery information;
acquire the output value of the second sensor from the power conditioning circuitry; and
compare the output value of the second sensor and an output value of the first sensor included in the storage battery information, and output the comparison result, wherein
the control circuitry further includes a malfunction indication lamp configured to be turned based on the comparison result.

2. A storage battery system connected to a power system and operative based on a charge/discharge request from an energy management system that manages electric power supply/demand of the power system, the storage battery system comprising:
a storage battery;
battery management circuitry configured to monitor a state of the storage battery with a first sensor;
power conditioning circuitry configured to
convert AC power of the power system into DC power;
charge the storage battery with the DC power;
convert DC power of the storage battery into AC power;
discharge the AC power to the power system; and
perform charge to the storage battery and discharge from the storage battery with reference to an output value of a second sensor; and
control circuitry configured to
receive the charge/discharge request and storage battery information supplied from the battery management circuitry;
control the power conditioning circuitry based on the charge/discharge request and the storage battery information;
acquire the output value of the second sensor from the power conditioning circuitry; and
compare the output value of the second sensor and an output value of the first sensor included in the storage battery information, and output the comparison result, wherein
the control circuitry further includes an interlock processing circuitry configured to perform interlock processing based on the comparison result.

3. The storage battery system according to claim 2, wherein
the interlock processing circuitry is configured to include processing of stopping output of a charge/discharge command to the power conditioning circuitry as the interlock processing.

4. The storage battery system according to claim 2, wherein
the interlock processing circuitry is configured to include processing of outputting a trip command to the power conditioning circuitry as the interlock processing.

5. A storage battery system connected to a power system and operative based on a charge/discharge request from an energy management system that manages electric power supply/demand of the power system, the storage battery system comprising:
a storage battery;
battery management circuitry configured to monitor a state of the storage battery with a first sensor;
power conditioning circuitry configured to
convert AC power of the power system into DC power;
charge the storage battery with the DC power;
convert DC power of the storage battery into AC power;
discharge the AC power to the power system; and
perform charge to the storage battery and discharge from the storage battery with reference to an output value of a second sensor; and
control circuitry configured to
receive the charge/discharge request and storage battery information supplied from the battery management circuitry;
control the power conditioning circuitry based on the charge/discharge request and the storage battery information;
acquire the output value of the second sensor from the power conditioning circuitry; and
compare the output value of the second sensor and an output value of the first sensor included in the storage battery information, and output the comparison result, wherein
the first sensor and the second sensor are current sensors.

6. A storage battery system connected to a power system and operative based on a charge/discharge request from an energy management system that manages electric power supply/demand of the power system, the storage battery system comprising:
a storage battery;
battery management circuitry configured to monitor a state of the storage battery with a first sensor;
power conditioning circuitry configured to
convert AC power of the power system into DC power;
charge the storage battery with the DC power;
convert DC power of the storage battery into AC power;
discharge the AC power to the power system; and
perform charge to the storage battery and discharge from the storage battery with reference to an output value of a second sensor; and
control circuitry configured to
receive the charge/discharge request and storage battery information supplied from the battery management circuitry;
control the power conditioning circuitry based on the charge/discharge request and the storage battery information;
acquire the output value of the second sensor from the power conditioning circuitry; and compare the output value of the second sensor and an output value of the first sensor included in the storage battery information, and output the comparison result, wherein
the first sensor and the second sensor are voltage sensors.

* * * * *